United States Patent [19]

Oram et al.

[11] Patent Number: 4,982,605
[45] Date of Patent: Jan. 8, 1991

[54] AIR FLOW MONITOR AND TEMPERATURE COMPENSATING CIRCUIT THEREFOR

[75] Inventors: James W. Oram, Lombard; Price R. Hodson, Glen Ellyn; Paul F. Haake, Highland Park, all of Ill.

[73] Assignee: Alnor Instrument Company, Skokie, Ill.

[21] Appl. No.: 352,979

[22] Filed: May 17, 1989

[51] Int. Cl.$^5$ .......................... G01F 1/68; F24F 11/04
[52] U.S. Cl. .................................. 73/204.19; 98/115.3
[58] Field of Search ............ 73/204.15, 204.18, 204.19, 73/198, 204.25; 98/115.3

[56] References Cited

U.S. PATENT DOCUMENTS

| | | | |
|---|---|---|---|
| 2,726,546 | 12/1955 | King, Jr. | 73/204.19 |
| 2,959,958 | 11/1960 | Savet | 73/181 |
| 3,595,079 | 7/1971 | Gran | 73/204.15 |
| 3,645,133 | 2/1972 | Simeth et al. | 73/204.15 |
| 3,811,250 | 5/1974 | Fowler, Jr. | 55/274 |
| 3,891,391 | 6/1975 | Boone | 73/204.19 X |
| 3,942,378 | 3/1976 | Olmstead | 73/204 |
| 4,205,377 | 5/1980 | Oyama et al. | 364/431 |
| 4,264,961 | 4/1981 | Nishimura et al. | 364/510 |
| 4,343,183 | 8/1982 | Plapp | 73/204.15 |
| 4,373,378 | 2/1983 | Nishimura et al. | 73/204.19 |
| 4,377,969 | 3/1983 | Nelson | 98/115 |
| 4,466,341 | 8/1984 | Grogan | 98/115 LH |
| 4,501,144 | 2/1985 | Higashi et al. | 73/204 |
| 4,528,898 | 7/1985 | Sharp et al. | 98/115.3 |
| 4,537,068 | 8/1985 | Wrobel et al. | 73/202 |
| 4,548,128 | 10/1985 | Morikawa et al. | 98/115.3 |
| 4,581,929 | 4/1986 | Sugiura | 73/204.19 X |
| 4,599,895 | 6/1986 | Wiseman | 73/204.18 |
| 4,637,251 | 1/1987 | Carp | 73/204.19 X |
| 4,672,847 | 6/1987 | Uchiyama et al. | 73/204.19 |
| 4,682,503 | 7/1987 | Higashi et al. | 73/755 |
| 4,706,553 | 11/1987 | Sharp et al. | 98/115.3 |
| 4,781,065 | 11/1988 | Cole | 73/204.18 X |
| 4,860,583 | 8/1989 | Olson | 73/204.15 |

OTHER PUBLICATIONS

Brochure: Hoffman Controls Corp., "Electronic Laboratory/Fume Hood Controller", 1/84, 4 pages.
Brochure: Hamilton Industries, "Safeaire TM Fume Hoods, Accessories", 11/86, 1 page.
Brochure: TSI Inc., "TSI Hood Velocity Controller Model 1615D", 2 pages.
Brochure: Dynamics Corp. of America, Anemostat Products Div., "The Anemostat Total System", undated, 2 pages.

Primary Examiner—Herbert Goldstein
Attorney, Agent, or Firm—Silverman, Cass & Singer, Ltd.

[57] ABSTRACT

A temperature compensated air flow monitor which measures true flow velocity or volume flow. The air flow monitor can be mounted in or coupled to a fume hood and includes a fluid flow tube having a pair of thermistors mounted therein. A first cold thermistor is utilized to provide temperature compensation to the second hot thermistor which provides the fluid flow velocity measurement. The pair of thermistors can be mounted to or in a probe for a portable air flow monitor application. The measured flow velocity or volume flow can be utilized in a display for the operator and also can activate one or more alarms when the flow velocity varies from a desired range.

10 Claims, 5 Drawing Sheets

AIR FLOW MONITOR AND TEMPERATURE COMPENSATING CIRCUIT THEREFOR

BACKGROUND OF THE INVENTION

The invention relates generally to air flow monitors and more particularly to a temperature compensated air flow monitor for measuring true flow velocity or volume flow.

There are numerous applications for air flow monitors, such as spray booths, clean rooms, grinding operations and fume hoods. The monitored flow can be velocity flow or volume flow wherein volume flow is the area times the velocity through the area.

Fume hoods serve to protect an operator from noxious fumes contained or generated within the fume hood. The fume hood has one or more openings in a face of the fume hood and the exhaust is preset to provide a desired flow velocity of air into the hood. To assure the safety of the operator, it is necessary to confirm that the required flow velocity is maintained.

In general, prior art fume hood monitors measure the mass flow of the air rather than the true flow velocity. Such mass flow measuring systems, such as described in U.S. Pat. No. 4,548,128, appear to be dependent upon the density of the fluid or air flowing past the monitor. This does not necessarily relate to the true flow velocity of the fume hood.

A flow measuring system described in U.S. Pat. No. 3,942,378, states that the measuring system compensates for changes in fluid density. This measuring system however requires two separate complicated sets of flow sensors.

The thermal anemometer described in U.S. Pat. No. 4,537,068, states that true flow velocity is measured. The thermal anemometer includes a thermistor heated to a high operating temperature of 200° C. Heating to this temperature utilizes too much power for practical portable applications. Further, the thermistor sensed temperature is corrected by a linear temperature device, which generally are expensive.

It would be desirable to measure the true flow velocity or volume flow and to provide temperature compensation for such measurement, for example, in a fume hood.

SUMMARY OF THE INVENTION

The disadvantages of the prior art flow and techniques are overcome in accordance with the present invention by providing a temperature compensated air flow monitor which measures true flow velocity or true volume flow.

The air flow monitor includes a pair of thermistors. A first cold thermistor is utilized to provide temperature compensation to the second heated thermistor which provides the fluid flow velocity measurement. The measured flow velocity can be utilized in a display for the operator and also can activate one or more alarms when the flow velocity varies from the desired range. The air flow monitor can be a portable unit supporting the two thermistors on a probe or the air flow monitor can be mounted in a fume hood and include a fluid flow tube, in which the two thermistors are mounted.

DESCRIPTION OF THE PREFERRED EMBODIMENTS

Figure 1:
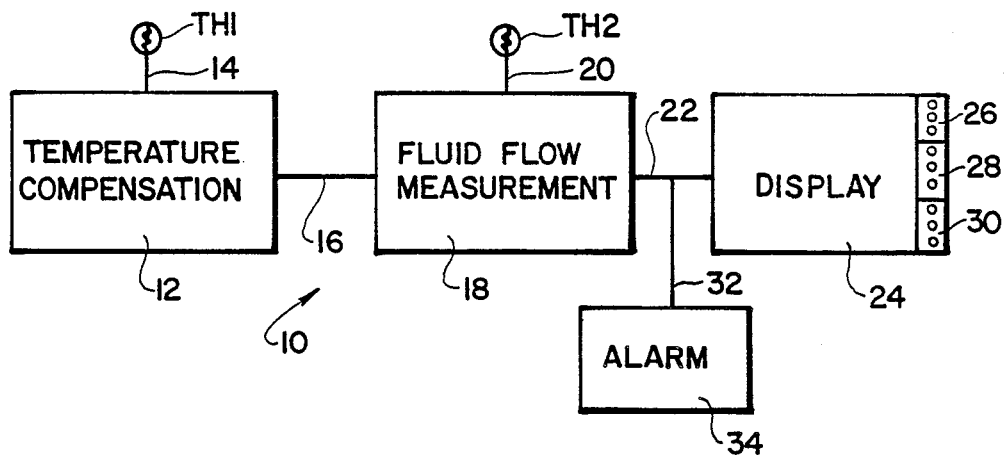
FIG. 1 is a block diagram of one embodiment of the air flow monitor of the present invention.

Referring to FIG. 1, an air flow monitor of the present invention is designated generally by the reference numeral 10. The air flow monitor 10 includes a temperature compensation circuit 12, which includes an input lead 14 coupling the temperature compensation circuit 12 to a cold thermistor (TH1). The temperature compensation circuit 12 provides a temperature compensation output on a lead 16 to a fluid flow measurement circuit 18.

The fluid flow measurement circuit 18 includes an input lead 20, which couples the fluid flow measurement circuit 18 to a second heated thermistor (TH2). The fluid flow measurement circuit 18 provides a true temperature compensated fluid flow velocity signal on an output lead 22, which is coupled to a display 24. The display 24 can be any type of velocity indicating display, for example, an analog dial or digital output (not illustrated) or can be an array of lamps or LED's 26, 28 and 30. The arrays 26, 28 and 30 can indicate the true flow rate in ranges such as normal for the array 28, high flow rate for the array 26 and low flow rate for the array 30. The flow signal on lead 22 also can be coupled on a lead 32 to an alarm 34, which can be an audio and/or visual alarm, activated for a desired out of flow condition, such as high or low flow.

Thermistors are very convenient devices to utilize in the air flow monitor 10, since they are relatively durable and inexpensive. On the other hand, a single thermistor could not be utilized effectively since thermistors are highly non-linear and would give different readings as the fluid temperature changed changed from ambient temperature. Heat transfer from a thermistor due to fluid flow can be modeled utilizing the well known King's Law that models heat transfer from a heated cylinder. King's Law states that:

$$\frac{I_H^2 R_H}{R_H - R_c} = A + B * \text{Velocity}^n \quad (1)$$

where:
$R_H$ is the resistance of the heated element;
$R_c$ is the resistance of an unheated element;
A, B and n are constants for a normal temperature range of 0°-50° C.;
$I_H$ is the current through the heated element.

Equation (1) can be utilized to provide an indication of fluid flow as seen in equation (2):

$$\frac{I_H^2}{1 - \frac{R_c}{R_H}} = \text{function (Velocity)} \quad (2)$$

To indicate true fluid flow velocity, only one variable can be allowed to change. Thus, to measure the correct velocity for changing temperatures, the ratio of $R_c/R_H$ must be held constant. If the ratio is not held constant then, even though the actual velocity has not changed, the indicated velocity will change as temperature changes, because $R_c$ changes with temperature. This uncompensated velocity measurement is often called the mass flow velocity.

Figure 2:
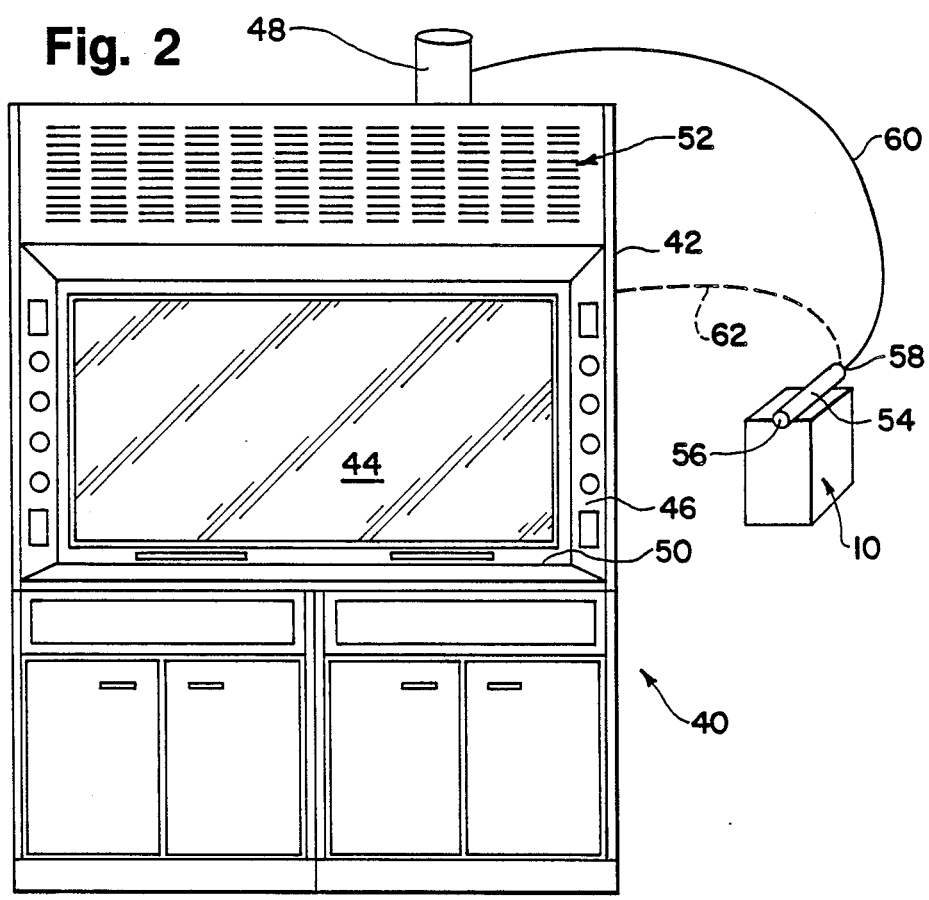
FIG. 2 is a diagrammatic view of a fume hood with the air flow monitor of the present invention coupled thereto.

Referring to FIG. 2, the air flow monitor 10 can be utilized in or coupled to a fume hood 40. The fume hood 40 includes a hood body 42, which may include a movable door or window 44 in a front face 46 thereof.

The fume hood 40 is connected to a blower to exhaust air through an exhaust throat or pipe 48. The flow velocity through the fume hood typically changes by the size of an opening or openings formed in the face 46 of the fume hood 40, such as by an adjustable opening 50, provided by sliding or tilting of the door 44. The fume hood 40 typically includes a conventional air bypass section 52. The flow velocity through the fume hood 40 also can be adjusted by a variable air volume exhaust blower.

To ensure that the flow velocity is correct, the air flow monitor 10 is coupled to the fume hood 40 in one of two ways. The air flow monitor 10 includes an air flow tube 54, which preferably is mounted to extend from an inlet opening 56 to the exterior of the air flow monitor 10 at an exit 58. The air flow tube 54 includes the two thermistors TH1 and TH2 mounted therein. The monitor 10 can measure either the actual face flow velocity or the total flow, depending on how the fume hood is coupled to the fume hood 40.

To measure the total fume hood volume flow monitor 10 includes a tube 60, which couples the outlet 58 of the air flow monitor 10 to the exhaust throat 48. The air flow monitor 10 then measures the air flowing through the air flow tube 54 from the ambient air at the inlet 56 to the exhaust 48 via the outlet 58 and the tube 60.

To measure the actual face flow velocity, a portion of the air flowing into the fume hood 40 can be measured by coupling the exit 58 to an opening in the fume hood 40 by a tube 62 (shown in dotted lines). The tube 62, of course, replaces the tube 60 for the face flow velocity measurement. Also, although the air flow monitor 10 has been illustrated as coupled to the fume hood 40, the air flow monitor 10 also can be mounted to the interior of the fume hood 40 with the inlet 56 opening through the face wall 46 and the exit 58 open to the interior of the fume hood 40.

Figure 3:
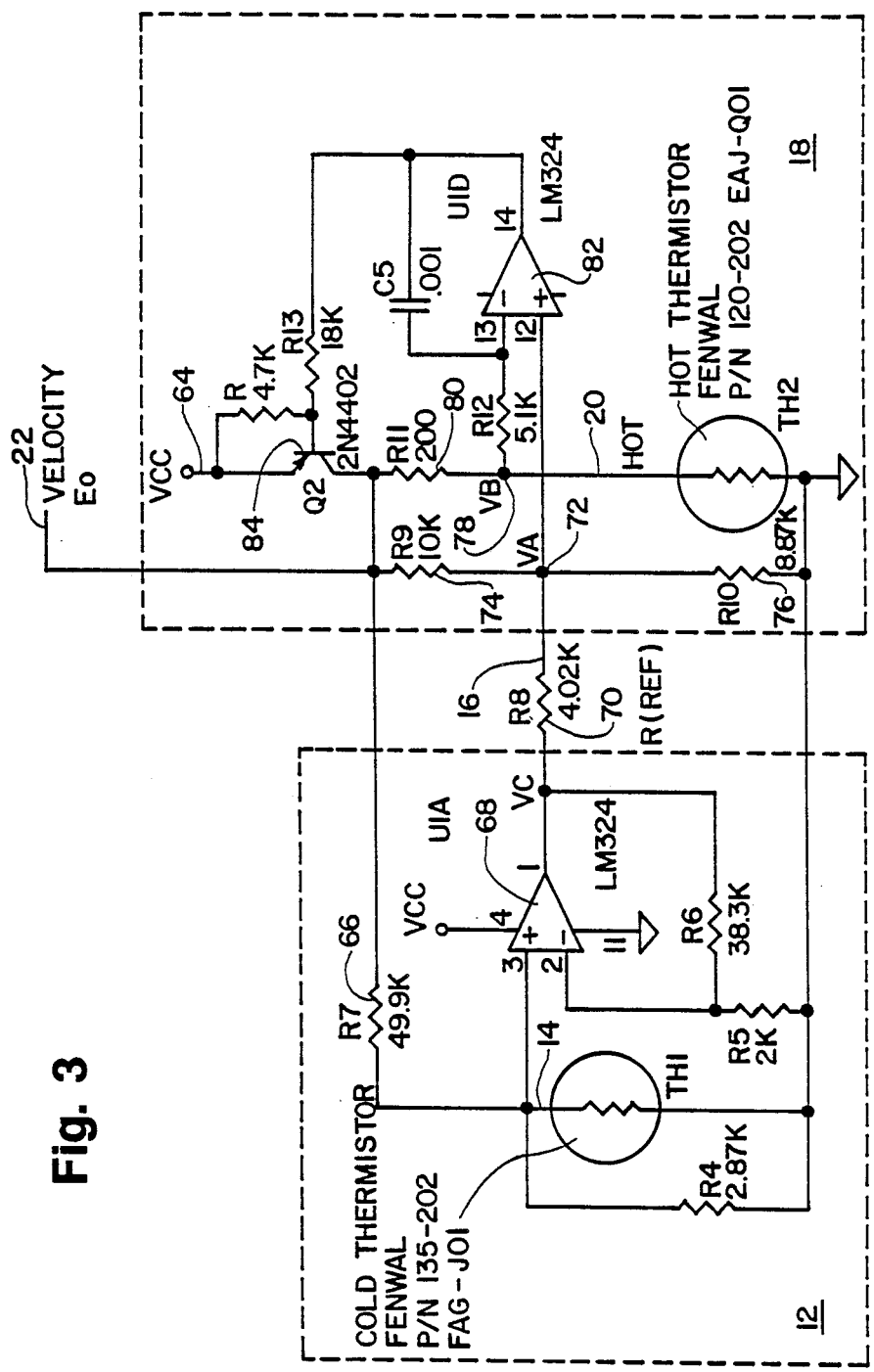
FIG. 3 is a schematic diagram of the temperature compensating and flow velocity measuring circuit of the air flow monitor utilized with the fume hood.

The details of the temperature compensation circuit 12 and the fluid flow measurement circuit 18 of the air flow monitor when utilized with the fume hood 40 are best illustrated in FIG. 3. The circuits 12 and 18 are described herein for utilization in the fume hood 40, but are equally applicable for utilization in any flow system.

The temperature compensation circuit 12 includes the first thermistor TH1, which is a cold (i.e. non heated) thermistor. The current through the thermistor TH1 is limited to avoid self-heating of the thermistor TH1. The temperature compensation circuit 12 is coupled to a supply voltage on a lead 64 by a resistor 66. The output of the first thermistor TH1 is coupled through an amplifier 68 and a resistor 70 and the output lead 16 to one node 72 of a bridge circuit forming the fluid flow measurement circuit 18. The node 72 is coupled to the supply voltage 64 by a resistor 74 and to ground by a resistor 76. A second node 78 of the bridge circuit is coupled to the supply voltage 64 by a resistor 80 and to ground by the second heated thermistor TH2. The thermistor TH2 preferably is heated only to a low operating temperature on the order of 70° C. above ambient, or about 90° C.

The difference of the voltages on the nodes 72 and 78 is maintained at zero, because as the flow across TH2 changes, the resistance RH changes and the output on lead 22 is automatically changed by an amplifier circuit 82, coupled to the nodes 72 and 78 and to a transistor 84. The output or voltage on lead 22 is a proper measurement of the true fluid flow as long as the ambient fluid temperature does not change. The atmospheric pressure is assumed to be constant.

When the ambient temperature changes, the temperature compensation circuit 12 adds or subtracts current from the node 72 to offset the temperature change. This current change effectively maintains the ratio of $R_c/R_H$ approximately constant, as required. If the temperature compensation circuit 12 was not present, then the same effect could be had by changing the value of resistor 76. Since, however, resistor 76 is a fixed value, the resistance is effectively changed by adding or subtracting current through the resistor 70 at the node 72.

To effectively change the current at the node 72, the direct current level at the output of the amplifier 68 must change. The amplifier 68 also sees a feedback current via the resistor 66 as the output on lead 22 changes due to velocity. The velocity feedback current to the amplifier 68 negates the velocity component fed via the resistor 70 to the node 72 and hence the current added or subtracted is only the direct current value due to ambient temperature changes sensed by the first thermistor TH1.

The velocity feedback to the amplifier 68 is important, because without the feedback signal as the velocity changes, the applied DC correction current in resistor 70 would not be constant for a specific temperature. A voltage component of velocity would be seen across the resistor 70. Normally, the applied correction should be a steady current relating to the ambient temperature, regardless of velocity. But if no feedback were present via the resistor 66 and the amplifier 68 to cancel the velocity component that would be across the resistor 70, the compensation current 12 would be changing with velocity AND temperature resulting in near or total instability. Under these conditions the fluid flow measurement circuit 18 will be unpredictable and will oscillate. Hence, the output on the lead 22 will not be reliable or usable. It further is desirable that the velocity component across the resistor 70 be kept to a minimum. Only the temperature component should be present. The feedback via resistor 66, TH1, and the amplifier 68 allows this to be obtained.

Figure 4:
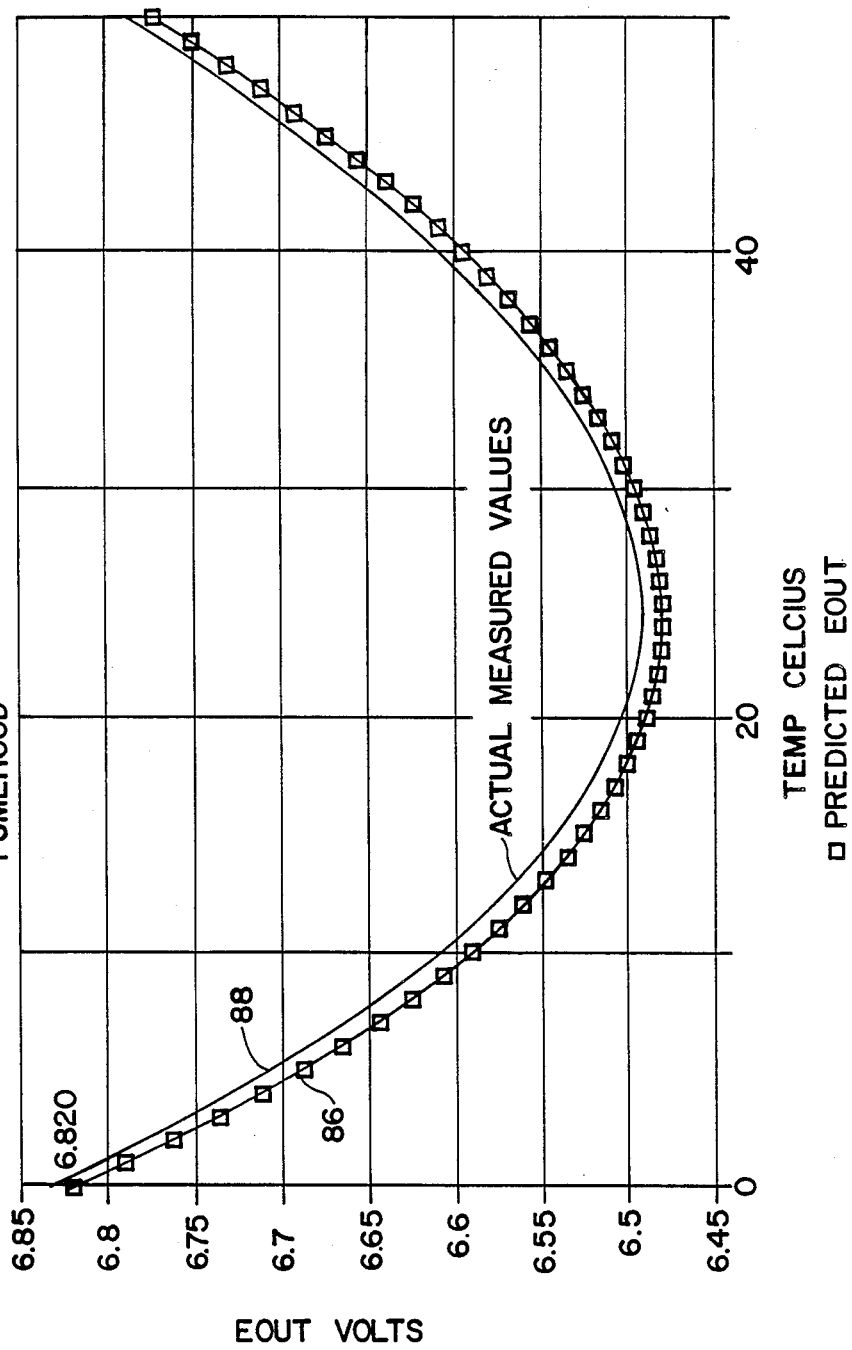
FIG. 4 is a graph illustrating the output of the fume hood air flow, monitor versus changes in temperature.

Referring to FIG. 4, Eout on lead 22 is illustrated over the operating range of 0° to 50° C. A first curve 86 is a plot of the predicted or calculated values of Eout, while a second curve 88 is a plot of the actual measured values of the air flow monitor 10 utilized with a fume hood like the fume hood 40. FIG. 4 is generated making resistance 70 in FIG. 3, a value of 2870 ohms with no flow passing through the air flow tube 54. The vertical axis in FIG. 4 is greatly amplified to show detail changes with temperature. For the value of resistance 70 as shown in FIG. 3, the curves 86 and 88 in FIG. 4 become much flatter above 25° C. Under this condition, the ratio of $R_cR_H$ is allowed to change slightly.

Figure 5:
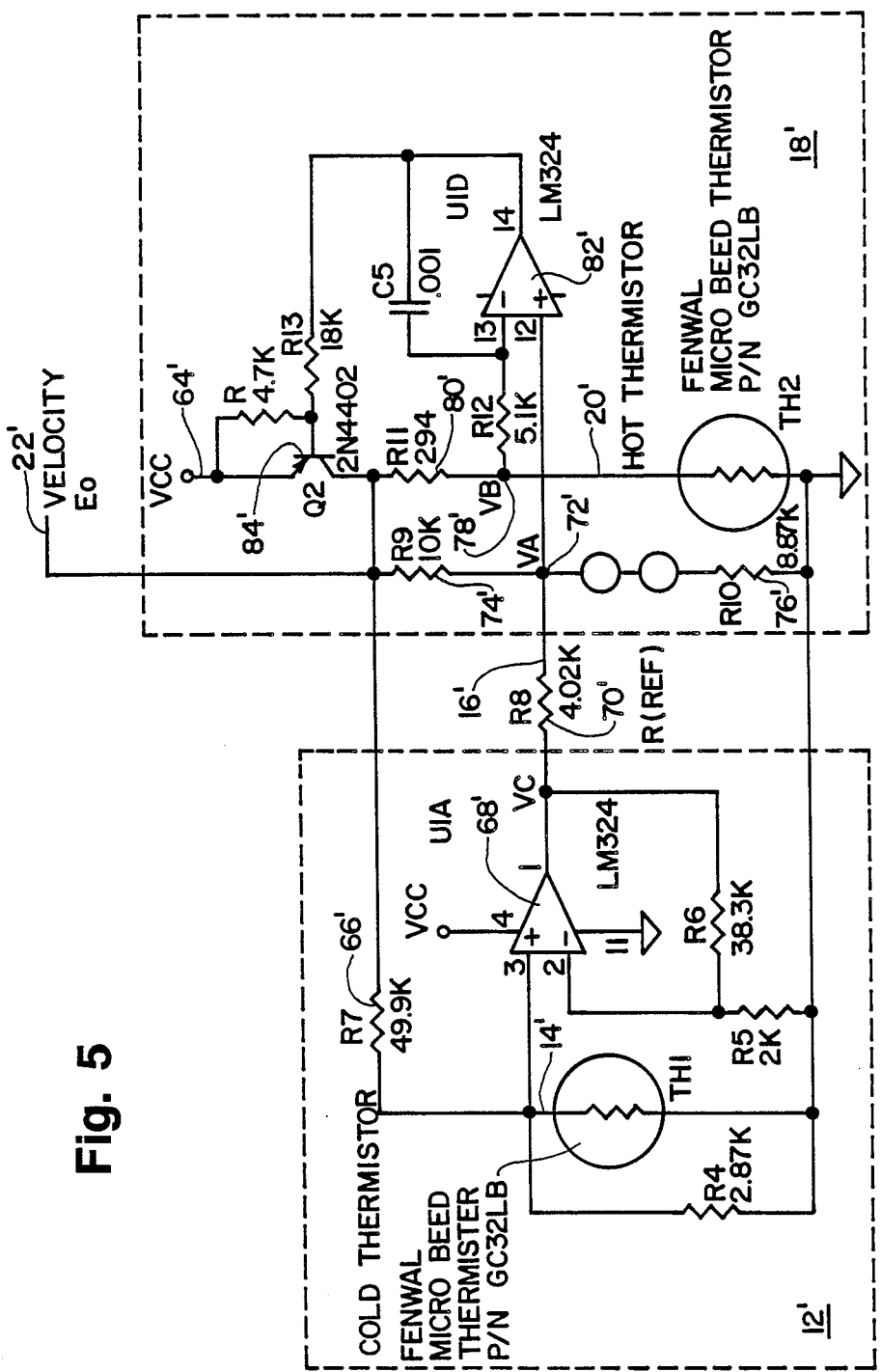
FIG. 5 is a schematic diagram of the temperature compensating and flow velocity measuring circuit of the air flow monitor utilized in a portable measuring unit.

The temperature compensation circuit 12 and fluid flow measurement circuit 18 illustrated in FIG. 3, include component values determined for use in the fume hood 40. The air flow monitor 10 also can be utilized in a portable application, wherein the thermistors TH1 and TH2 are not located in the air flow tube 54, but instead are mounted on or in a probe (not illustrated) for insertion into the flow to be measured. One such portable instrument the Model 9850 ThermoAnemometer, sold by the assignee of the present application. The component values are slightly different but the circuits 12' and 18' illustrated in FIG. 5, are essentially the same as the corresponding elements in the circuits 12 and 18 in FIG. 3. The low operating temperature of TH2 provides long battery life.

Figure 6:
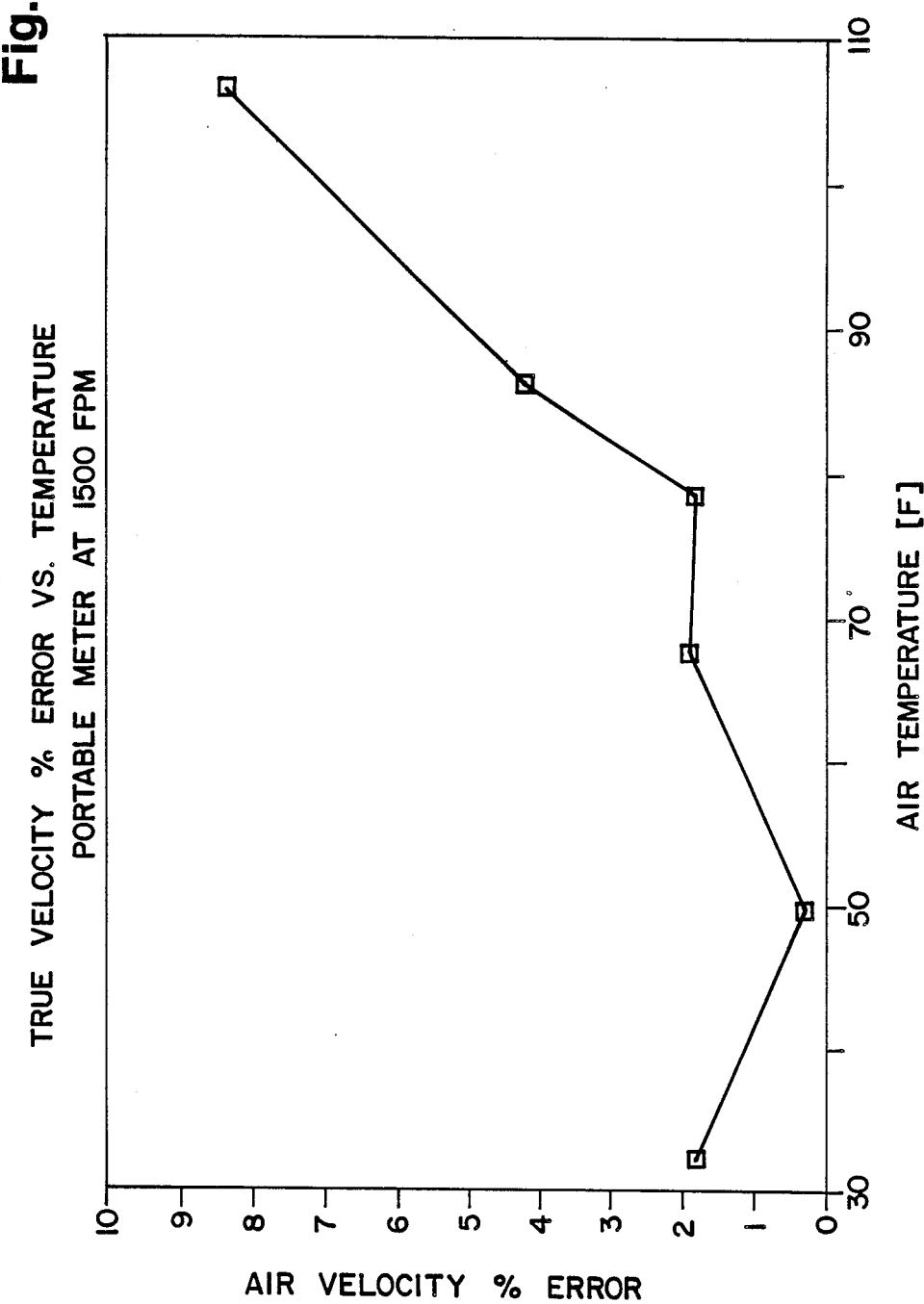
FIG. 6 is a graph illustrating the percentage error in linearized velocity output of the air flow monitor versus changes in temperature.

The measured error output of the air flow monitor 10 utilized in the portable probe is illustrated in FIG. 6. The percentage reading error is below seven percent for the operational range of from 0° to 40° C.

Modifications and variations of the present invention are possible in light of the above teachings. It is therefore to be understood that within the scope of the appended claims, the invention may be practiced otherwise than as specifically described.

What is claimed and desired to be secured by Letters Patent of the United States is:

1. A method of monitoring fluid flow in a fume hood having a front face, an interior and an exhaust therefrom, comprising:
    coupling a fluid flow tube between the face of the fume hood and the interior thereof;
    providing a pair of thermistors in said fluid flow tube;
    heating a first one of said thermistors and passing fluid thereover;
    sensing and measuring the face fluid flow velocity of said fume hood by monitoring the resistance change in said heated thermistor; and
    compensating for changes in ambient temperature by adding or subtracting current flow in relation to resistance changes in a second unheated one of said thermistors located in said fluid flow.

2. The method as defined in claim 1 including providing feedback to said second thermistor from said first thermistor to eliminate velocity fluctuations in said temperature compensation.

3. The method as defined in claim 1 further including sensing and measuring the volume fluid flow in said fume hood.

4. The method as defined in claim 1 including displaying said measured fluid flow velocity.

5. The method as defined in claim 3 including providing a predetermined fluid flow velocity range and activating an alarm if said measured fluid flow velocity is outside of said fluid flow velocity range.

6. An apparatus for monitoring fluid flow in a fume hood having a front face, an interior and an exhaust therefrom, comprising:
    a fluid flow tube coupled between the face of the fume hood and the interior thereof;
    a pair of thermistors located in said fluid flow tube;
    means for heating a first one of said thermistors and passing fluid thereover;
    means for sensing and measuring the face fluid flow velocity of said fume hood by monitoring the resistance change in said heated thermistor; and
    means for compensating for changes in ambient temperature by adding or subtracting current flow related to resistance changes in a second unheated one of said thermistors located in said fluid flow.

7. The apparatus as defined in claim 6 including means for providing feedback to said second thermistor from said first thermistor to eliminate velocity fluctuations in said temperature compensation.

8. The apparatus as defined in claim 6 wherein said means for sensing and measuring further includes sensing and measuring the volume fluid flow in said fume hood.

9. The apparatus as defined in claim 6 including means for displaying said measured fluid flow velocity.

10. The apparatus as defined in claim 9 including providing a predetermined fluid flow velocity range and means for activating an alarm if said measured fluid flow velocity is outside of said fluid flow velocity range.

* * * * *